United States Patent [19]
Henseler et al.

[11] Patent Number: 5,280,948
[45] Date of Patent: Jan. 25, 1994

[54] GAS CUSHION SYSTEM

[75] Inventors: Wolfgang Henseler, Tübingen; Egon Katz, Nagold, both of Fed. Rep. of Germany

[73] Assignee: Mercedes-Benz AG, Fed. Rep. of Germany

[21] Appl. No.: 84,170

[22] Filed: Jun. 30, 1993

[30] Foreign Application Priority Data

Jul. 15, 1992 [DE] Fed. Rep. of Germany ....... 4223237

[51] Int. Cl.$^5$ ............................................. B60R 21/16
[52] U.S. Cl. .............................. 280/728 A; 280/728 R; 280/740
[58] Field of Search ........... 280/728 R, 728 A, 730 R, 280/732, 740

[56] References Cited

U.S. PATENT DOCUMENTS

| | | | |
|---|---|---|---|
| 3,708,181 | 1/1913 | Mazelsky | 280/740 |
| 3,778,085 | 12/1973 | Lipkin | 280/728 |
| 3,880,447 | 4/1975 | Thorn et al. | 280/728 |
| 4,191,392 | 3/1980 | Barnett | 280/740 |
| 5,062,664 | 11/1991 | Bishop et al. | 280/728 A |
| 5,121,941 | 6/1992 | Mihm et al. | 280/728 |
| 5,172,933 | 12/1992 | Strasser | 280/732 X |
| 5,197,756 | 3/1993 | Jarlowe et al. | 280/728 |

FOREIGN PATENT DOCUMENTS

| | | |
|---|---|---|
| 0447030 | 9/1991 | European Pat. Off. . |
| 2109463 | 8/1988 | Fed. Rep. of Germany . |
| 3147780 | 8/1988 | Fed. Rep. of Germany . |
| 3910337 | 10/1989 | Fed. Rep. of Germany . |
| 4141617 | 7/1992 | Fed. Rep. of Germany . |
| 56-208884 | 9/1983 | Japan . |
| 2257400 | 1/1993 | United Kingdom ................ 280/728 |

OTHER PUBLICATIONS

Automotive Industries, Aug. 1988, one page.

Primary Examiner—Margaret A. Focarino
Assistant Examiner—Christopher P. Ellis
Attorney, Agent, or Firm—Evenson, McKeown, Edwards & Lenahan

[57] ABSTRACT

A gas cushion system such as an airbag system has an essentially vat-shaped, elongated housing with an open longitudinal side, and a tubular housing disposed within the housing in a longitudinal direction thereof between its end faces, for a cartridge-shaped gas generator. The generator functions to inflate a gasbag disposed on the open longitudinal side of the vat-shaped housing. The vat-shaped and tubular housings form a prefabricatable unit, into which the gas generator can be directly inserted without any separate housing.

15 Claims, 1 Drawing Sheet

GAS CUSHION SYSTEM

BACKGROUND AND SUMMARY OF THE INVENTION

The present invention relates to a gas cushion system (e.g., an airbag system) for arrangement as collision-protection for passengers in motor vehicles, and, more particularly, to a system having an essentially vat-shaped, elongated housing installable in the vehicle and with an open longitudinal side which, in the installed position, faces the passenger, a tubular housing disposed within and between end faces of the elongated housing in the longitudinal direction for a cartridge-shaped gas generator, by way of which a gasbag disposed on the open longitudinal side of the vat-shaped housing can be automatically inflated in the event of an accident.

Gas cushion systems are shown in EP-A 04 47 030 and U.S. Pat. No. 5,121,941. The gas generator in these documents has a beaker-like housing with extrusion molded axial flanges formed on in one piece. The flanges allow the housing to be applied, on one hand, to parts of the motor vehicle which are capable of bearing loads and, on the other hand, to wall parts of the vat-shaped housing. The beaker-like housing forms a part of the outer wall of the vat-shaped housing.

In order to eliminate incorrect fittings, special precautions have to be taken, as specified, for example, in U.S. Pat. No. 5,121,941 (col. 9, 1. 58 to col. 10, 1. 5). In addition, further publications such as U.S. Pat. No. 3,778,085, U.S. Pat. No. 3,880,447, U.S. Pat. No. 4,191,392, DE-C 31 47 780, DE-A 39 10 337, DE-A 41 41 617 and JP-A 56-20 88 84, show gas cushion systems in which the vat-shaped and tubular housings are respectively configured as sheet-metal parts which overall necessitate a relatively complex fitting because fitting errors cannot be precluded without increased complexity.

DE-C 21 09 463 shows a steering wheel having a gas cushion system in which the hub region of the steering wheel is configured as a funnel-shaped synthetic housing which is open in the direction of the driver. The folded-up gas cushion is, in the non-used position, disposed on the open side. Within an essentially beaker-shaped region in the center of the funnel-shaped housing, the associated gas generator is disposed within a sheet-metal housing.

DE-U 86 19 670 shows a further gas cushion system in which an essentially vat-shaped sheet-metal housing has an open longitudinal side on which the gas cushion is disposed. In that side of the housing lying opposite the open longitudinal side, a trough-like recess is configured for receiving a propellant charge which serves as a gas generator and is held within the trough by a synthetic capsule.

An object of the present invention is to make possible, in a gas cushion system, a particularly economical production and to prevent virtually any wrong fitting or installation.

The foregoing object has been achieved according to the present invention by the configuring of the tubular housing and lateral or longitudinal vat-shaped housing walls running parallel to the tube axis to form parts of a one-piece extrusion profile, or the tubular and vat-shaped housings form a one-piece casting, in particular a die-casting, and by inserting the cartridge-shaped gas generator directly (without any separate, additional housing) into the tubular housing.

The present invention is based upon the discovery that an error-free fitting of the gas cushion system is made significantly easier if the vat-shaped and tubular housings form a one-piece unit, into which the cartridge-shaped gas generator can then be readily inserted. At the same time, the total manufacture of the gas cushion system is sub-divided into easily surveyable production sections, namely housing manufacture, insertion of the gas cartridge and arrangement of the gasbag. This facilitates any modifications which are made for adaptation to different vehicles. In addition, the exchange of system elements is made easier.

BRIEF DESCRIPTION OF THE DRAWINGS

These and further objects, features and advantages of the present invention will become more readily apparent from the following detailed description when taken in conjunction with the accompanying drawings wherein.

DETAILED DESCRIPTION OF THE DRAWINGS

Figure 1:
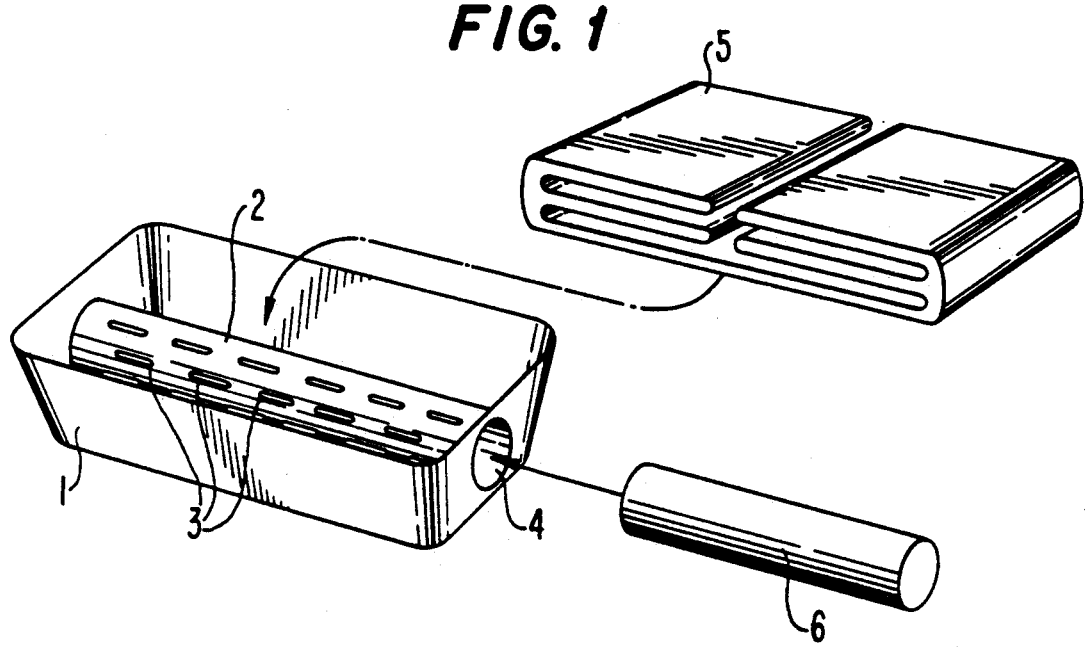
FIG. 1 is a perspective exploded view in the dismantled state of a gas cushion system according to the present invention.

According to FIG. 1, within an essentially vat-shaped housing 1, the upper longitudinal side of which, in the illustrated position, is open, a tubular housing 2 is disposed between the housing end faces in the longitudinal direction of the housing 1, which tubular housing 2 is connected firmly in one piece (i.e., integrally) to the housing 1. A plurality of, for example, slot-shaped openings 3 are provided in the wall of the tubular housing 2. The interior of the tubular housing 2 is accessible via an opening 4 on a front end face of the vat-shaped housing 1.

The tubular housing 2 can be disposed such that, between its wall and the longitudinal sides of the vat-shaped housing 1, a predetermined clearance is left completely thereover. The openings 3 in the wall of the tubular housing 2 can be disposed, at least partially, also on that side of the tubular housing 2 facing a housing wall of the housing 1.

Provided on the open side of the vat-shaped housing 1 is a gasbag 5, which when not in use is folded up and which can be inflated in the event of an accident by a cartridge-shaped gas generator inserted through the opening 4 into the tubular housing 2 and requires, apart from the housing 2, no further housing. The cartridge of the gas generator 6 has a sheath made from filter material, in order to prevent particles produced upon the ignition of the gas generator 6 from being able to pass into the interior of the housing 1 or into the gasbag 5.

The housing 1, 2 shown in FIG. 1 can be manufactured by die-casting methods from light metal or the like. It is also possible to use synthetic material for the housing 1, 2 as long as it is sufficiently resistant to the heat which is generated upon the ignition of the gas cartridge 6.

Figure 2:
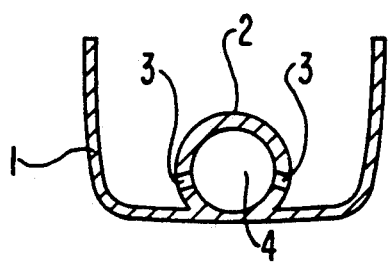
FIG. 2 is a cross-sectional view of the housing shape.

FIG. 2 shows a cross-section of a particularly preferred embodiment of the vat-shaped and tubular housings 1, 2. In this embodiment, the tubular housing 2 is disposed directly on that housing wall of the vat-shaped housing 1 lying opposite the open side of the vat-shaped housing 1, so that the two housings 1, 2 have a common wall section.

In the embodiment of the housing 1, 2 shown in FIG. 2, the manufacture of this housing 1, 2 can be effected by casting technology or the like. It is also within the scope of the present invention and advantageous if the housing 1, 2 comprises a section of an extrusion profile having the cross-section evident from FIG. 2 and end walls (not represented in greater detail in FIG. 2) which are bonded to the abovementioned section of the extrusion profile or are firmly connected thereto in some other conventional way.

The present invention is distinguished by the fact that the tubular and vat-shaped housings 1, 2 can be prefabricated in a simple manner and by the fact that the cartridge-shaped gas generator can then be slid directly into the interior of the tubular housing 2 without any separate, additional housing. In relation to the currently conventional production method, in which the cartridge-shaped gas generator is disposed initially in a separate, tubular housing which must then, in turn, be disposed, in a manner to be checked for correct fitting, in a separate, vat-shaped housing, the present invention is distinguished by a high level of error-elimination and a low level of complexity.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A gas cushion system for passenger collision-protection for passengers in a motor vehicle, comprising an approximately vat-shaped, elongated housing configured to be installable in the motor vehicle and having an open longitudinal side adapted to face a passenger space in the vehicle, in an installed position, and a tubular housing disposed within the elongated housing and between end faces of the elongated housing in a longitudinal direction, and configured to receive a cartridge-shaped gas generator for automatically inflating a gasbag disposed on the open longitudinal side of the elongated housing in the event of an accident, wherein parts of the wall of the tubular housing and a lower wall of the elongated housing running parallel to an axis of the tubular housing, form at least a portion of a one-piece extrusion profile and the tubular housing and elongated housing form a one-piece unit casting, and the cartridge-shaped gas generator absent any separate housing is configured to be insertable directly into the tubular housing.

2. The gas cushion system according to claim 1, wherein a clearance is left between the wall of the tubular housing and longitudinal sides of the elongated housing.

3. The gas cushion system according to claim 1, wherein openings are disposed in the wall of the tubular housing for passage of gases generated by the gas generator and are, at least partially disposed, on a side of the tubular housing which faces away from one of the gasbag and the open longitudinal side of the elongated housing.

4. The gas cushion system according to claim 3, wherein a clearance is left between the wall of the tubular housing and longitudinal sides of the elongated housing.

5. The gas cushion system according to claim 1, wherein the tubular housing is disposed directly at the lower wall of the elongated housing.

6. The gas cushion system according to claim 5, wherein a clearance is left between the wall of the tubular housing and longitudinal sides of the elongated housing.

7. The gas cushion system according to claim 6, wherein openings are disposed at the wall of the tubular housing for passage of gases generated by the gas generator and are, at least partially disposed, on a side of the tubular housing which faces away from one of the gasbag and the open longitudinal side of the elongated housing.

8. The gas cushion system according claim 1, wherein a unit formed by the elongated and tubular housings is made of light metal.

9. The gas cushion system according to claim 8, wherein a clearance is provided between the wall of the tubular housing and longitudinal sides of the elongated housing.

10. The gas cushion system according to claim 9, wherein openings are disposed at the wall of the tubular housing for passage of gases generated by the gas generator and are, at least partially disposed, on a side of the tubular housing which faces away from one of the gasbag and the open longitudinal side of the elongated housing.

11. The gas cushion system according to claim 10, wherein the tubular housing is disposed directly at the lower wall of the elongated housing.

12. The gas cushion system according to claim 1, wherein the unit formed by the elongated and tubular housings is made of synthetic material.

13. The gas cushion system according to claim 12, wherein a clearance is provided between the wall of the tubular housing and longitudinal sides of the elongated housing.

14. The gas cushion system according to claim 13, wherein openings are disposed at the wall of the tubular housing for passage of gases generated by the gas generator and are, at least partially disposed, on a side of the tubular housing which faces away from one of the gasbag and the open longitudinal side of the elongated housing.

15. The gas cushion system according to claim 14, wherein the tubular housing is disposed directly at the lower wall of the elongated housing.

* * * * *